(12) United States Patent
Schulz et al.

(10) Patent No.: US 6,754,296 B2
(45) Date of Patent: Jun. 22, 2004

(54) APPARATUS AND METHOD FOR GENERATING A REFERENCE FREQUENCY

(75) Inventors: Detlef Schulz, Trier (DE); Gerhard Bethscheider, Ayl (DE); Peter Siebert, Wasserliesch (DE)

(73) Assignee: Societe Europeenne des Satellites, S.A., Chateau de Betzdorf (LU)

( * ) Notice: Subject to any disclaimer, the term of this patent is extended or adjusted under 35 U.S.C. 154(b) by 0 days.

(21) Appl. No.: 09/924,693

(22) Filed: Aug. 8, 2001

(65) Prior Publication Data

US 2002/0136339 A1 Sep. 26, 2002

Related U.S. Application Data

(63) Continuation of application No. PCT/EP00/01037, filed on Feb. 9, 2000.

(51) Int. Cl.[7] .............................................. H04L 25/00
(52) U.S. Cl. ..................................................... 375/371
(58) Field of Search ................................ 375/371, 326, 375/329; 327/147, 155, 156, 105, 106, 107; 331/1 A, 18

(56) References Cited

U.S. PATENT DOCUMENTS

| | | | | |
|---|---|---|---|---|
| 5,588,025 A | * | 12/1996 | Strolle et al. ............... | 375/316 |
| 5,841,987 A | | 11/1998 | Blatter et al. | |
| 6,128,433 A | * | 10/2000 | Gable et al. .................. | 386/87 |

FOREIGN PATENT DOCUMENTS

EP 0 836 282 A 4/1998

OTHER PUBLICATIONS

P.A. Sarginson, "MPEG–2: A Tutorial Intro. to the Systems Layer", IEEE Colloquium on MPEG–2, 1995, pp. 4/1–4/13.
Soo In Lee et al, "Implementation of MPEG–2 Ts Remultiplexer and Data Transport Unit for HDTV Satellite Broadcasting", IEEE Transactions on Consumer Electronics, vol. 43, No. 3, Jun. 11–13, 1997, pp. 324–329.

* cited by examiner

*Primary Examiner*—Stephen Chin
*Assistant Examiner*—Kevin Kim
(74) *Attorney, Agent, or Firm*—Wolf, Greenfield & Sacks, P.C.

(57) ABSTRACT

The invention refers to an apparatus for generating a reference frequency depending on a timing information extracted from a data stream. In order to generate a carrier frequency in a user station of a satellite TDMA network at low costs which is accurate and stable and which meets stringent phase noise requirements, it is suggested to use at least one free-running oscillator. The frequency deviation with regard to the timing information extracted from the data stream is estimated by an estimation means. At least two oscillation signals are derived from the at least one oscillation means and are linked together by a linking means yielding said reference frequency. A frequency correction value is applied to at least one of the oscillation signals such that the timing information given by the reference frequency corresponds to the timing information extracted from said data stream.

39 Claims, 4 Drawing Sheets

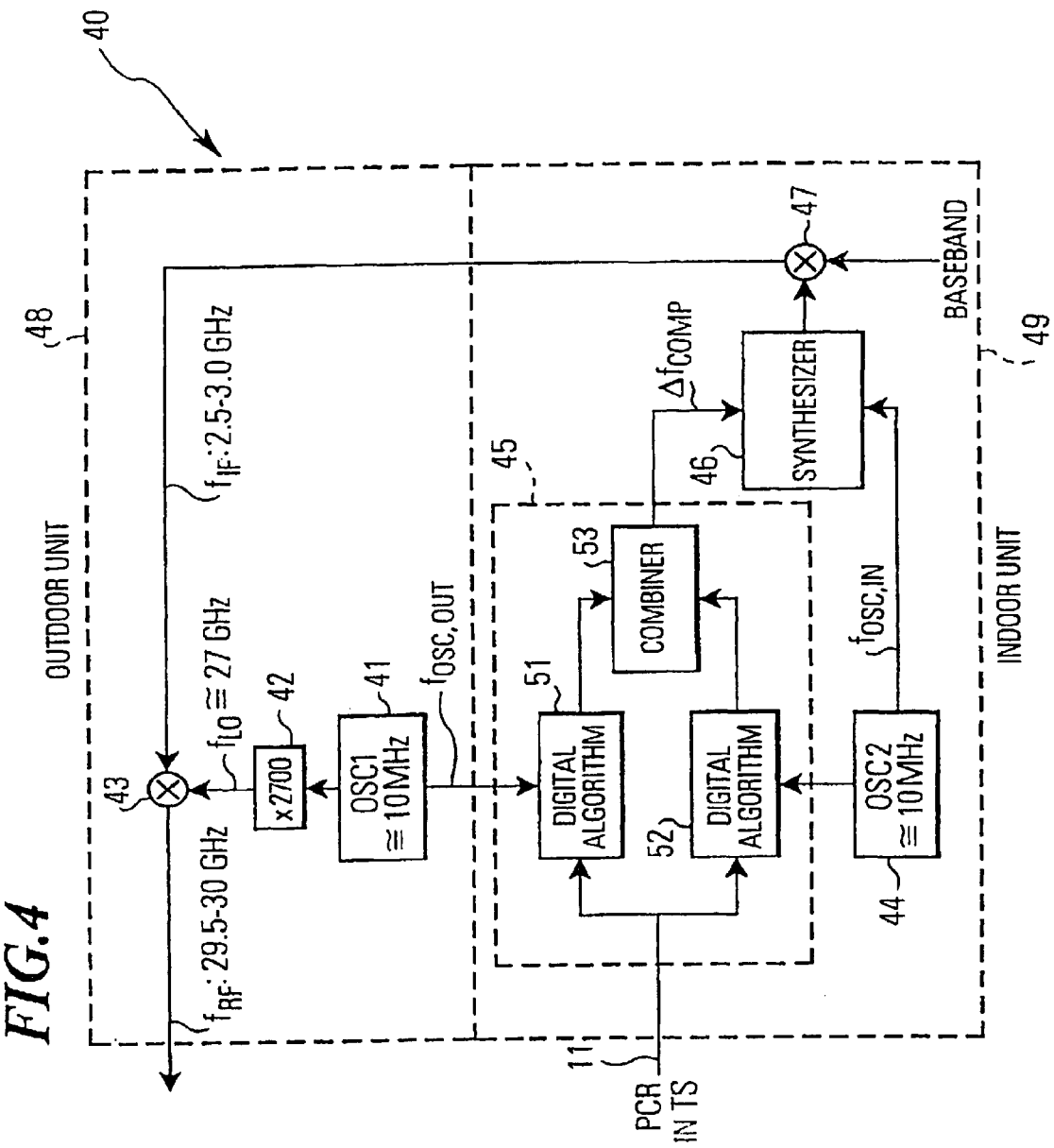

APPARATUS AND METHOD FOR GENERATING A REFERENCE FREQUENCY

This is a continuation of PCT/EP00/01037, filed on Feb. 9, 2000.

FIELD OF THE INVENTION

The invention relates to an apparatus and a method for generating a reference frequency.

BACKGROUND OF THE INVENTION

In a satellite TDMA network the various user stations need a common time and frequency reference for deriving their first transmission instance and their carrier frequency. Therefore, time and frequency synchronization of the user stations is an important feature which must respect severe constraints in order to lead to an efficient system with minimum interference between users and maximum throughput.

From WO 98/13969 time stamping clocks are synchronized in an ATM-network for compensating or measuring delays in the network. In an ATM-network the time value is sent in a field designated TSTP. The TSTP field consists in 32 bits and the time value is stored as the 32 least significant bits of the number of micro seconds that have passed since Jan. 1, 1972. By simply calculating the time difference of these values time stamping clocks can be run in each node which are phase-locked to the network synchronization clock. However, timing of the time stamping clocks can vary due to delays within the ATM-network. Delays in packet switched networks occur e.g. when switching a packet from one node in the network to another node. These delays can vary significantly and are due to the degree of utilization in the network and in individual nodes. Therefore, it is both necessary to measure and compensate the delays so as to enable a network to be trimmed or to ascertain which parts of the network are subjected to greater or smaller delays.

Firstly, in order to synchronize the time stamping clocks in different nodes these clocks are phase-locked to network-synchronization clocks and additionally, an absolute time is obtained from a GPS receiver. The GPS receiver supplies a TOD (Time Of Day) and PPS (Pulse Per Second) to a synchronization function. The synchronization function uses TOD to provide an absolute time for the time stamping clock in a node. There is thus obtained a synchronized absolute time between the time stamping clocks in the different nodes with a resolution of one second. The PPS pulse is used to obtain a degree of accuracy of one micro second between the clocks. Because the time stamping clocks are phase-locked to the network synchronization clocks and not to the GPS, the time stamping clocks will continue to have a high degree of accuracy even if the GPS equipment should malfunction or if the signal from the GPS satellite should be disturbed.

Secondly, delays are measured by time stamping a packet, i.e. by storing in the packet a value which represents the time at which the packet leaves the node. The packet is then sent to another node in the network and this node reads the stored value and compares the set value with the value on the time stamping clock in the own node. This provides a value of the delay.

From EP 0 564 220 A2 a clock synchronization system for synchronizing the performance of a number of clocks with a reference clock is disclosed. Each clock of this synchronization system includes a counter that indicates the current time and that is sequentially incremented by clock signal. A time, counter controller both initializes the counter and generates the clocking signal that controls the advancement of the counter. The time counter controller further monitors the time indicated by the counter and compares it to a reference-time signal received from a reference clock. Based on the comparison, the time counter controller selectively reinitializes the counter and adjusts a rate at which a clocking signal supplied to the counter so as to ensure that the counter advances at a rate equal to the rate at which the reference clock advances. Preferably, a reference-time signal is received from a global positioning system (GPS).

From EP 0 671 828 A1 a clock circuit is known to recover timing and transmitted information signals in a data receiver. Thereby, the accuracy of a low cost local master clock can be increased. The timing relationship can be derived from horizontal synch or colour burst pulses provided in a broadcast television signal. Another possibility of receiving a timing relationship is using a data packet communication scheme as digital HDTV data packet format or MPEG-2 format.

From EP 0 836 282 A1 an adapted phase-lock loop circuit is known for extracting time stamps from a MPEG-2 transport stream for obtaining a synchronized reference time. In a MPEG-2 transport stream a PCR (Program Clock Reference) time stamp is periodically transmitted. The PCR is detected from the transport stream by a PCR extracting circuit. When the time reference value is detected a counter counts a clock oscillated by a VCO (Voltage Controlled Oscillator) and a comparator compares the value of the counter and the value of the PCR. The phase difference between both values is fed back to the VCO through a digital filter. In the control start stage, the gain of the digital filter is designated to a large value. Thus, the phase difference is quickly converged to the allowable difference range. In the lock stage, the gain is designated to a small value. Thus, the control operation is stably performed.

For generating a time reference in a user station of a satellite TDMA network it has to be observed that the user station generally consists of an indoor unit (IDU) and an outdoor unit (ODU). The outdoor unit comprises a satellite antenna with an upconverter and/or a downconverter wherein the indoor unit comprises an encoder/decoder and a QPSK modulator. Having this separation-between an indoor unit and an outdoor unit in the past different mechanisms have been employed to achieve synchronization especially for satellite systems:

The IDU uses an "expensive" Oven Controlled Oscillator (OCXO) as an extremely stable reference frequency. The IDU sends the signal at a fixed IF carrier frequency to the Outdoor Unit (ODU). The IDU also sends a reference frequency to the ODU, which is used by an "expensive" microwave oscillator in the ODU in order to generate the upconverter frequency. The Indoor Unit (IDU) exchanges messages with the Hub in order to correct its IF frequency.

Same as in above, but the Outdoor Unit (ODU) uses another independent "expensive" OCXO to have an extremely stable upconverter frequency. This avoids the use of a reference frequency sent from the IDU to the ODU.

The IDU locks its local oscillator to the down link signal, and exchanges messages with the Hub in order to generate the correct IF frequency. The IDU sends a reference frequency to the ODU, which is used by an "expensive", microwave PLL in the ODU in order to generate the upconverter frequency. This avoids the use of an expensive OCXO in the IDU.

In frequency agile systems, the IDU may also generate the IF signal directly in L-Band (959–2150 MHz), thus avoiding ODU upconverter frequency agility. The ODU upconverts the signal by a fixed oscillator frequency. This provides frequency agility but still requires an "expensive" microwave PLL in the ODU in order to control the upconverter frequency.

From EP-A-0836282 an adapted phase lock loop circuit is known for extracting timestamps from a MPEG-2 transport stream for obtaining a synchronised reference time. The adapted phase lock loop comprises a voltage controlled oscillator (VCO) for generating an internal reference frequency.

From U.S. Pat. No. 5,841,987 a system for generating a signal for coupling digital audio, video and data signals in compressed form via a bus is known. A processing means formats the digital audio, video and data signals into super packets for transmission via the bus. Each super packet comprises a timestamp, wherein receiving devices utilise the timestamp for clock synchronisation. The realisation of the clock synchronisation is not explained in more detail.

From P. A. SARGINSON: "MPEG-2: A Tutorial Introduction to the Systems Layer" IEE COLLEQUIUM ON MPEG-2, 1995, pages 4/1–4/13 and 500 IN LEE ET AL.: "Implementation of MPEG-2 TS Remultiplexer and Data Transport Unit for HDTV Satellite Broadcasting" IEEE TRANSACTIONS ON CONSUMER ELECTRONICS, vol. 43, no. 3, Jun. 11–13, 1997, pages 324–329, a general description of the fundamental principles of the MPEG-2 systems layer is known, wherein some examples for conventional TV and HDTV are explained.

However, all these solutions involve high costs. Therefore, it is an object of the invention to generate a carrier frequency in a user station of a satellite TDMA network at low costs which is accurate and stable and which meets stringent phase noise requirements.

SUMMARY OF THE INVENTION

According to a first aspect of the invention, apparatus is provided for generating a reference frequency depending on a timing information extracted from a data stream. The apparatus comprises at least one free-running oscillation means, wherein at least two oscillation signals are derived from the at least one oscillation means, estimation means for estimating for each of the at least one free-running oscillation means the frequency deviation on the basis of the timing information, frequency modifying means for modifying the frequency of at least one of the at least two oscillation signals by a frequency correction value, linking means for linking the at least two oscillation signals to a signal yielding said reference frequency wherein the reference frequency is connected with the frequencies of the at least two oscillation signals by an unambiguous functional relation, and controlling means for determining the respective frequency correction value on the basis of the at least one estimated frequency deviation such that the timing information given by the reference frequency corresponds to the timing information extracted from said data stream.

According to a second aspect of the invention, apparatus is provided for generating a reference time depending on a timing information extracted from a data stream. The apparatus comprises a counter driven by a free-running oscillator and adjustable by counter step adjustment, wherein the counter step adjustment is controlled such that the content of the counter tracks the timing information within the data stream and yields the reference time.

According to a third aspect of the invention, a telecommunication network is provided. The telecommunication network comprises a master station and several base stations, wherein the master station transmits a time information in a data stream to each of the base stations and each of the base stations comprises an apparatus for generating a reference frequency depending on a timing information extracted from a data stream, further comprising: at least one free-running oscillation means, wherein at least two oscillation signals are derived from the at least one oscillation means, estimation means for estimating for each of the at least one free-running oscillation means the frequency deviation on the basis of the timing information, frequency modifying means for modifying the frequency of at least one of the at least two oscillation signals by a frequency correction value, linking means for linking the at least two oscillation signals to a signal yielding said reference frequency wherein the reference frequency is connected with the frequencies of the at least two oscillation signals by an unambiguous functional relation, and controlling means for determining the respective frequency correction value on the basis of the at least one estimated frequency deviation such that the timing information given by the reference frequency corresponds to the timing information extracted from said data stream.

According to a fourth aspect of the invention, a method is provided for generating a reference frequency depending on a timing information extracted from a data stream. The method comprises the steps of: providing at least two oscillation signals derived from at least one free-running oscillation means, estimating for each of the at least one free-running oscillation means the frequency deviation on the basis of the timing information, modifying the frequency of at least one of the at least two oscillation signals by a frequency correction value, linking the at least two oscillation signals to a signal yielding said reference frequency wherein the reference frequency is connected with the frequencies of the at least two oscillation signals by an unambiguous functional relation, and determining the respective frequency correction value on the basis of the at least one estimated frequency deviation such that the timing information given by the reference frequency corresponds to the timing information extracted from said data stream.

According to a fifth aspect of the invention, a method is provided for generating a reference time on the basis of timing information extracted from a data stream. The method comprises the steps of: driving a counter having an adjustable counter step adjustment by a free-running oscillation means; controlling the counter step adjustment such that the content of the counter tracks the timing information within the data stream; and using the content of the counter as said reference time.

According to a sixth aspect of the invention, a method is provided for estimating the frequency deviation of a free-running oscillation means on the basis of timing information extracted from a data stream. The method comprises the steps of: driving a counter having an adjustable counter step adjustment by the free-running oscillation means; controlling the counter step adjustment such that the content of the counter tracks the timing information within the data stream; and using the counter step adjustment as an estimation of said frequency deviation.

The inventive solution is based on the cognition that within the user stations at least one free-running oscillator is provided from which at least a local oscillator (LO) frequency and an intermediate frequency (IF) are derived. It is possible to derive both the LO-frequency and the IF-frequency from one single free-running oscillator or to derive the LO-frequency from a first free-running oscillator and the IF-frequency from a second free-running oscillator.

Any deviation of the actual frequency of the free-running oscillator from its nominal value causes a deviation of the carrier frequency. Therefore, the idea of the invention is to estimate the frequency deviation of the free-running oscillator by comparison with a timing information extracted from a data stream and to modify the IF-frequency by a frequency correction value. The IF-frequency and the LO-frequency are linked by a linking means to a radio frequency (RF) wherein a controlling means determines the respective correction value on the basis of the estimated frequency deviation such that the timing information given by the reference frequency corresponds to the timing information extracted from said data stream.

Obtaining the RF-frequency as a reference frequency a reference time can be generated by a counter which is driven by the RF-frequency wherein the content of the counter yields the reference time.

Another possibility for generating a reference time depending on a timing information extracted from a data stream is to track the timing information of the data stream by a counter which is driven by an oscillator within a closed loop circuit wherein the content of the counter yields the reference time.

The invention can be applied to a telecommunication network comprising a master station and several base stations wherein the master station transmits a time information in a data stream to each of the base stations and wherein each of the base stations comprises an apparatus for generating a reference frequency according to the invention.

An apparatus and a method formed in accordance with the invention have a number of advantages. Hence, according to the invention the need for an expensive ODU oven controlled oscillator can be avoided. Furthermore, the synchronization of the carrier frequency is not required by the master station. Eventually, frequency and timing information to all base stations or user stations can be delivered on the basis of an MPEG accompliant mechanism avoiding the need for additional time synchronization mechanisms such as start of frame transmission or other specific mechanisms which are not defined by MPEG. Furthermore, if several indoor units are connected to one outdoor unit cost savings can be achieved by placing one single oscillator in the outdoor unit.

In accordance with one aspect of the present invention the timing information consists of time stamps transmitted within the data stream. Preferably the time stamps consist of a program clock reference (PCR) of a MPEG-2 transport stream based on a 27 MHz clock.

In accordance with another aspect of the present invention the linking means consists of at least one mixer whose output signal has a frequency which is a linear combination of the frequencies of the respective input signals. Usually, the mixer is combined with a filter such that the output signal of said mixer amounts to the sum of the frequencies of the input signals. However, it is also possible to design the filter in combination with the mixer such that the frequency of the output signal of said mixer amounts to the difference of the frequencies of the input signals.

In accordance with a further aspect of the present invention the estimation means estimates the frequency deviation of the respective oscillation means according to the formula $$\text{frequency deviation} = \frac{t_{inf}(\text{data}) - t_{inf}(\text{osc})}{t_{inf}(\text{data})} \cdot \text{frequency}(\text{osc})$$

with $t_{inf}(\text{data})$: timing information of data stream
$t_{inf}(\text{osc})$: timing information of oscillation means
frequency(osc): frequency of oscillation means Advantageously, the respective timing information is referred to the period after applying the last correction by the frequency modifying means, i.e. any time measurement for obtaining the timing information starts after the last correction by the frequency modifying means.

In accordance with another aspect of the present invention the estimation consists of a counter whose content tracks the timing information of the data stream within a closed loop circuit wherein the adjustment step for the counter serves as an estimation of the respective frequency deviation. Advantageously, the content of the counter can also be used as a reference time signal.

In accordance with a further aspect of the present invention the estimation comprises a phase-locked loop generating a PLL-frequency on the basis of the timing information wherein the frequency deviation is obtained by comparing the PLL-frequency with the frequency of the respective oscillation means.

In accordance with another aspect of the present invention the frequency modifying means consists of a frequency scaling means modifying the frequency of the respective oscillation signal by a scaling factor.

In accordance with a further aspect of the present invention the controlling means consists of a micro processor. For obtaining the frequency of the at least one oscillation means an AD-converter is provided. The AD-converter simply can consist of a comparator transferring the sinusoidal signal of the oscillation means in a square-wave signal which can easily be processed by the micro processor. If necessary, a frequency divider can be additionally provided in order to transfer the frequency of the at least one oscillation means to a lower frequency being more suitable with regard to the processing speed of the micro processor. To determine the deviation between the program clock reference of the MPEG-2 transport stream and the at least one oscillation means the transmitted PCR time stamp is periodically processed by the micro processor. There should be a constant ratio between the frequency of the at least one oscillation means and the program clock reference. If not, the micro processor has to determine the respective frequency correction value based on the difference between the internal frequency of the at least one oscillation means and the PCR value. Hence, also the estimation means can completely be implemented by software in the micro processor yielding a very simple and adaptable apparatus.

In accordance with another aspect of the present invention the at least one oscillation means consists of a first free-running oscillator. This implementation allows a most inexpensive realization of the invention. Furthermore, it has to be noted that in case of several indoor units are connected to one outdoor unit cost savings can be achieved in placing the single oscillator within the outdoor unit. Preferably, the frequency of the first free-running oscillator lies below the IF-frequency such that the IF-frequency is yielded by increasing the frequency of a first oscillation signal derived from the first free-running oscillator. Additionally, a second oscillation signal is derived from the first free-running oscillator which is fed to a frequency multiplier in order to provide an LO-frequency. The actual RF-frequency can be derived by mixing the IF-frequency with the LO-frequency. Due to the correction within the controlling means the frequency deviations of the first oscillation signal and the second oscillation signal derived from the first free-running oscillator are compensated such that the RF-frequency is a reference frequency with regard to the time reference received by the PCR values.

In accordance with another aspect of the present invention in addition to the first free-running oscillator a second free-running oscillator is provided yielding a third oscillation signal. The third oscillation signal is fed to the frequency modifying means yielding the IF-carrier signal wherein the second oscillation signal is still fed to the estimation means. Hence, the third oscillation signal is modified by the frequency modifying means such that the frequency deviations of the first free-running oscillator and the second free-running oscillator are compensated.

In order to transmit a payload signal or a user signal the IF-carrier signal is fed together with the user signal to a mixer yielding an intermediate transmission signal which is fed together with said second oscillation signal to a mixer yielding a RP-signal with a carrier frequency corresponding to said reference frequency.

BRIEF DESCRIPTION OF THE DRAWINGS

Other objects and features of the invention will become apparent by reference to the following specification and to the drawings in which FIG. 3 shows a block diagram of an estimation means according to counter adjustment and FIG. 4 shows a block diagram for generating a reference frequency according to a second embodiment of the invention.

DETAILED DESCRIPTION

Generally, it is referred to a telecommunication system with a master station having a central clock which is slaved to a professional standard and which will provide a stable and accurate 27 MHz clock with low phase noise. This signal is distributed via satellite to all user stations.

For distribution the time stamp mechanism as specified in MPEG-2 is employed.

A 42 bit counter is driven by this 27 MHz clock. At regular time intervals the counter value is read and put as PCR into the adaptation field of a TS packet.

In general the PCR values will be derived from the clock of the incoming video signal. However, the specified accuracy of this clock is not sufficient for synchronizing the return channel. Therefore it may be necessary to generate more precise PCR values.

Figure 1:
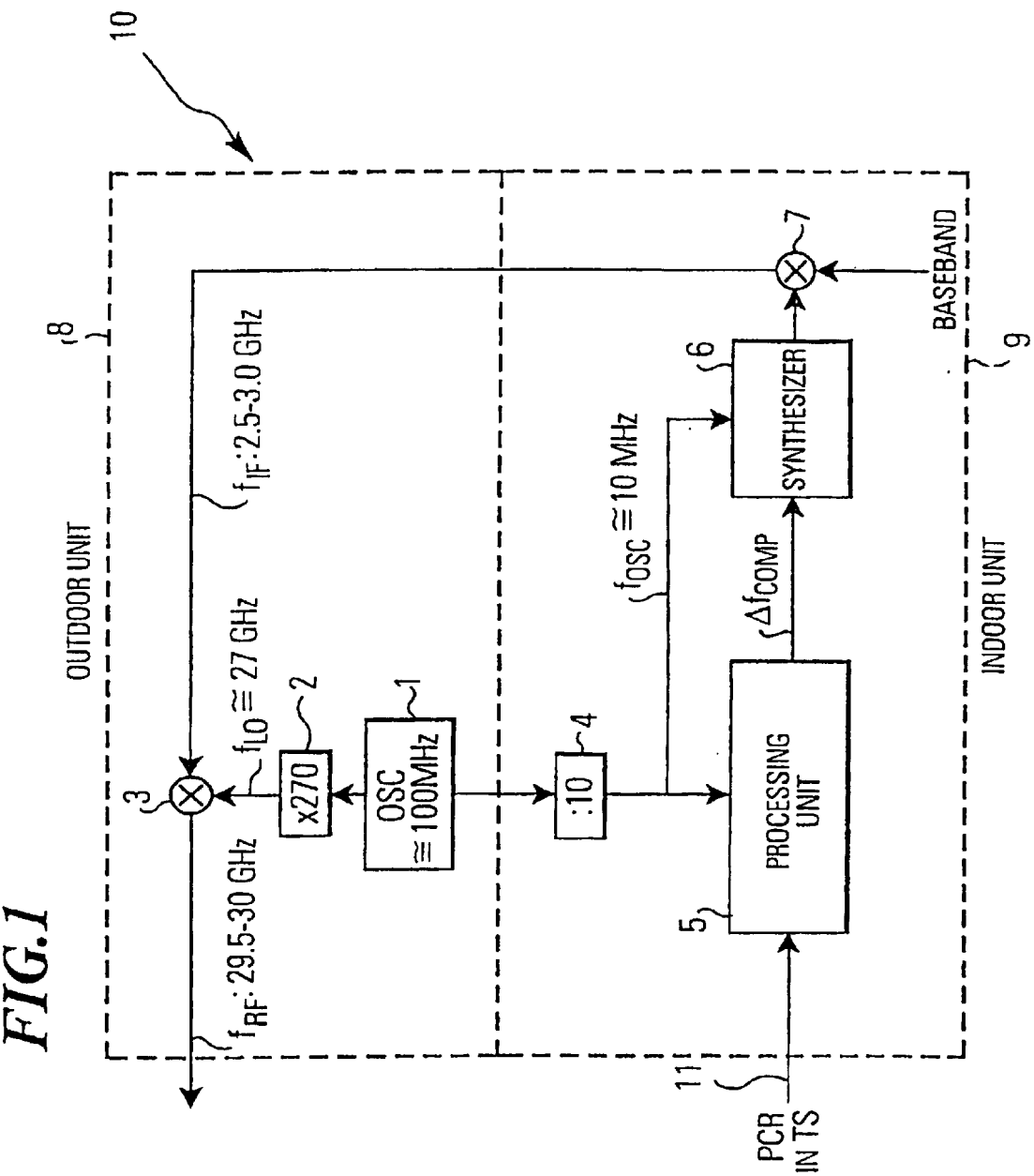
FIG. 1 shows a block diagram for generating a reference frequency according to a first embodiment of the invention.

FIG. 1 shows a block diagram for generating a reference frequency according to a first embodiment of the invention. A user station 10 is subdivided in an indoor unit 9 and outdoor unit 8. Within the outdoor unit 8 an oscillator 1 is provided which is typically a 100 MHz quartz oscillator with "pure" accuracy and long-term stability (20–30 ppm) but good phase noise. This oscillator 1 is located in the outdoor unit 8 from where a corresponding signal is fed to a frequency divider 4 yielding an oscillation signal $f_{OSC}$ with 10 MHz. An upconverter in the outdoor unit 8 will be driven by the oscillator 1 as well wherein a local frequency signal $f_{LO}$ is derived by a frequency multiplier 2 connected to said oscillator 1. Due to frequency variations of the oscillator 1 the signal $f_{LO}$ may have a frequency offset up to 2 MHz which needs to be compensated for.

To compensate this frequency deviation the frequency generated by the oscillator 1 in the outdoor unit 8 is compared with the timing information derived from the input signal 11 within the processing unit 5. The difference of this comparison will drive the synthesizer 6 such that the resulting carrier frequency $f_{IF}$ added to the actual local frequency $f_{LO}$ will provide the correct carrier frequency $f_{RF}$.

Hence, a corresponding frequency correction value $\Delta f_{COMP}$ is fed to the synthesizer 6 driven by the signal $f_{OSC}$ wherein the output of the synthesizer 6 is fed to a mixer 7 for modulating a payload signal yielding the carrier frequency $f_{IF}$. The signal $f_{IF}$ is fed to a further mixer 3 together with the signal $f_{LO}$ yielding the signal $f_{RF}$ with a carrier frequency equal to the desired reference frequency.

In the following the calculation of the compensation signal $\Delta f_{COMP}$ by the processing unit 5 is explained. $F_{OSC,nom}$ and $\Delta f_{OSC}$ shall be denoted as the nominal value and the fluctuation of the free-running oscillator frequency $f_{OSC}$. The estimation of the value $\Delta f_{OSC}$ will be explained in detail below with reference to FIG. 2 and FIG. 3

The LO and IF frequencies are given by $$F_{LO} = m_{LO} f_{OSC}$$

and $$F_{IF} = m_{IF}(f_{OSC} + \Delta f_{COMP}),$$

where $\Delta f_{COMP}$ denotes a compensation value to be applied to the synthesizer that generates the IF carrier, $m_{LO}$ denotes the multiplying factor of the frequency multiplier 2 and $m_{IF}$ denotes the factor of the synthesizer 6. The resulting RF carrier frequency $f_{RF}$ is given by $$f_{RF} = f_{RF,nom} + (m_{LO} + m_{IF})\Delta f_{OSC} + m_{IF}\Delta f_{COMP}$$

where $f_{RF,nom} = (m_{LO} + m_{IF})f_{OSC,nom}$ denotes the nominal RF carrier frequency. Hence, the deviation $\Delta f_{OSC}$ of the oscillator frequency $f_{OSC}$ is compensated by selecting $\Delta f_{COMP}$ as $$\Delta f_{COMP} = -\left(\frac{m_{LO} + m_{IF}}{m_{IF}}\right)\Delta f_{OSC}.$$

In the first embodiment the local oscillator was placed advantageously in the outdoor unit. However, it has to be noted that, without any restrictions to the above described embodiment, it is also possible to place the free-running oscillator within the indoor unit. In this case the clock pulse generated by the free-running oscillator has to be transferred from the indoor unit to the outdoor unit.

There are several possible implementations for estimating the frequency deviation $\Delta f_{OSC}$ of the oscillator 1 by the processing unit 5. In the following two possible implementations are discussed, namely an estimation according to the PLL-principle and an estimation according to counter adjustment.

Figure 2:
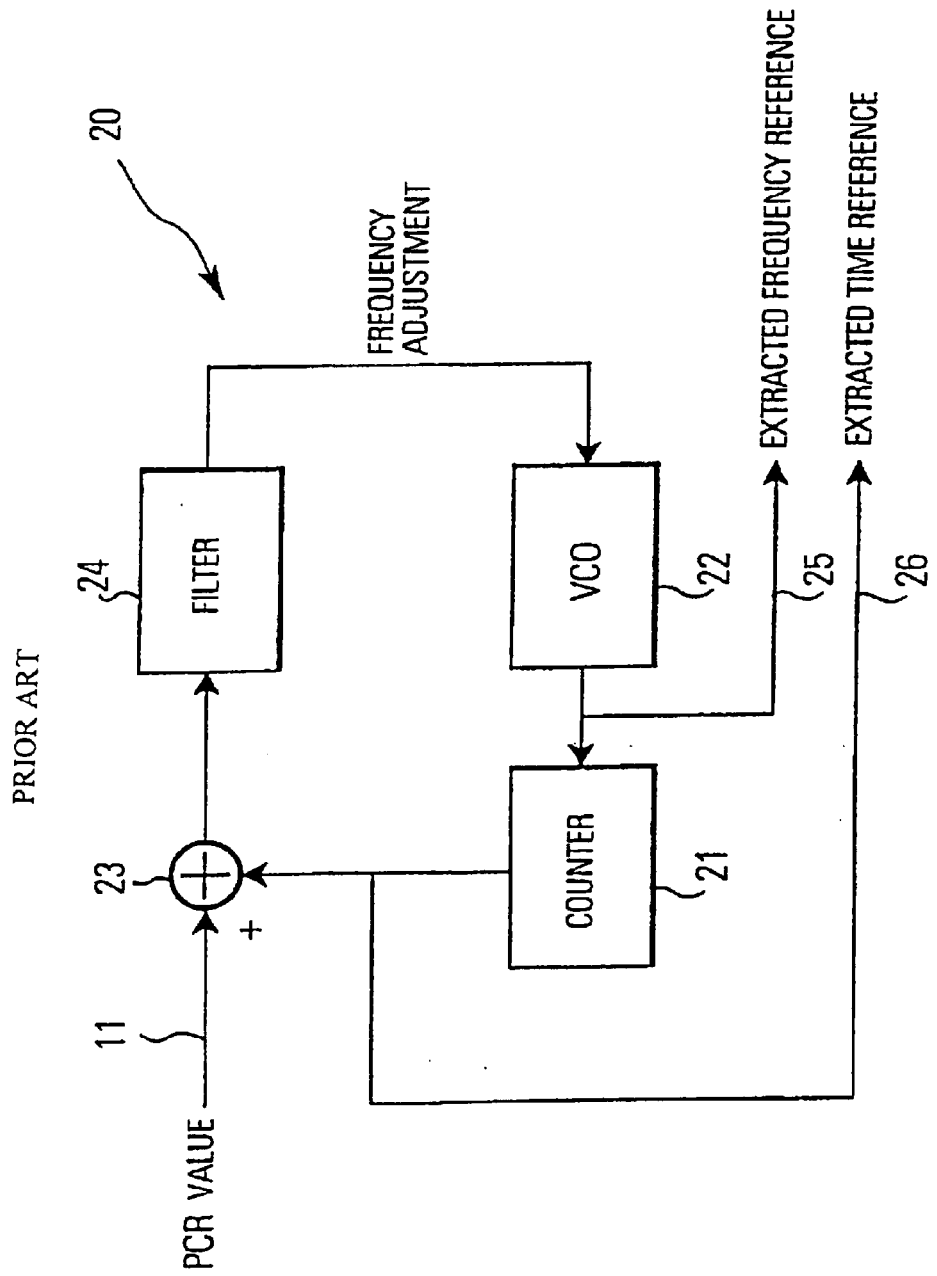
FIG. 2 shows a block diagram of an estimation means according to the PLL-principle.

FIG. 2 shows a block diagram of an estimation means according to the PLL-principle. The 27 MHz clock of the MPEG-2 reference is recovered by using a phase-locked loop (PLL) locked to the received PCR values of the input data stream 11. A counter 21 is driven by the clock signal of a voltage controlled oscillator (VCO) 22. The content of the counter 21 is compared with the PCR values of the input data stream 11 by a comparator 23. When the PCR value is larger than the counter content, the frequency of the VCO is increased by the feedback signal of the filter 24, wherein in the case of a smaller PCR value the frequency of the VCO 22 is decreased.

The signal 25 can be used as an extracted frequency reference with regard to the PCR values of the data stream 11. Furthermore, the counter content 26 can serve as a time reference within the user station.

The extracted frequency reference 25 can be used to obtain an estimation for the frequency deviation of the oscillator 1. This is done by assuming a given relationship between the extracted frequency reference 25 and the frequency of the signal $f_{OSC}$. Any offset from this relationship is compensated by the correction value $\Delta f_{COMP}$.

Figure 3:
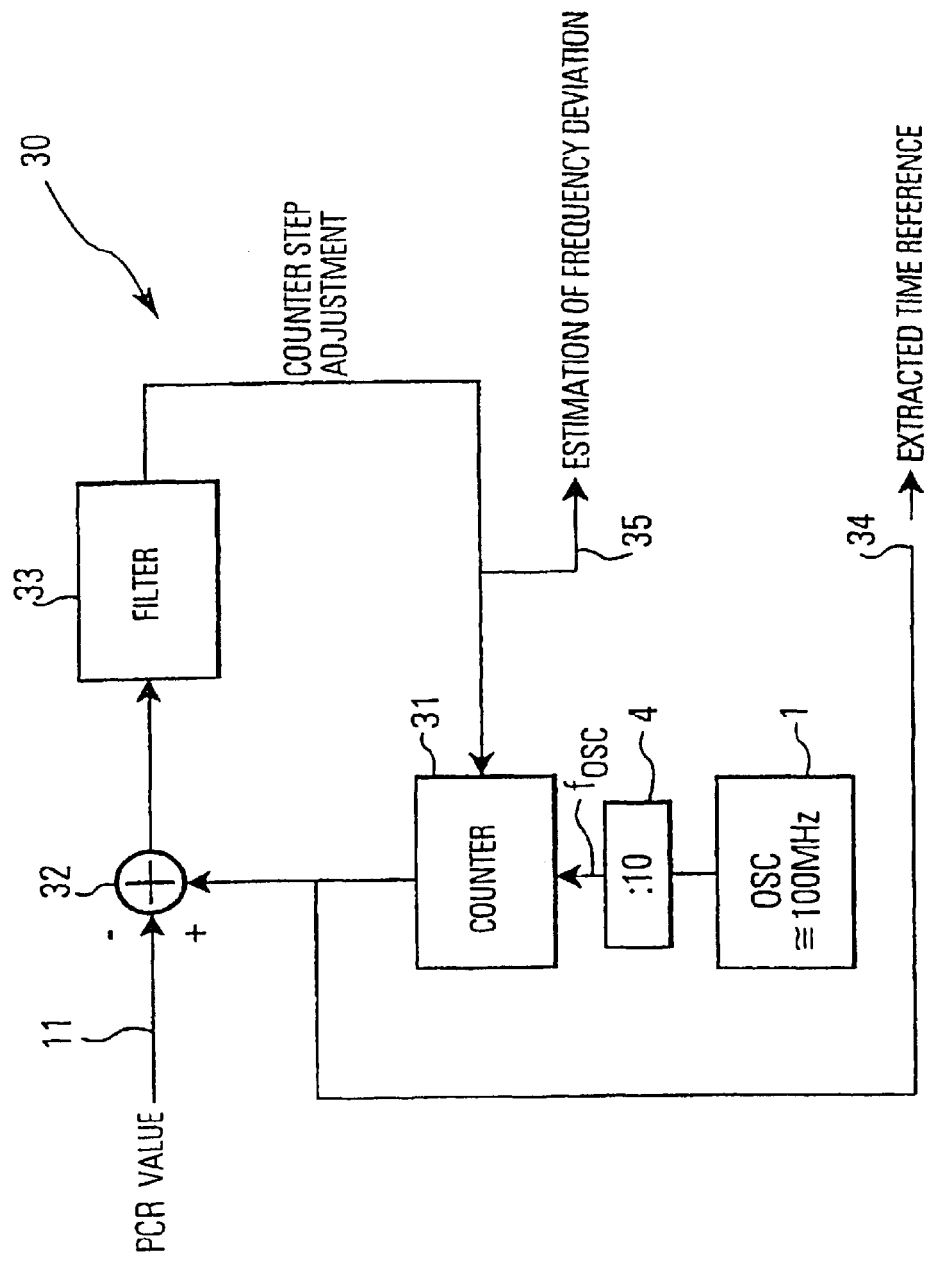

FIG. 3 shows a block diagram of an estimation means according to counter adjustment. The estimation means 30 makes use of a counter 31 driven by the free-running oscillator 1 and whose content tracks the received PCR values within the input data stream 11. The counter content 34 also serves as a time reference wherein the counter step adjustment 35 delivered by the filter 33 serves as an estimation of the frequency deviation between the frequency of the free-running oscillator 1 and the timing information based on the PCR values.

FIG. 4 shows a block diagram for generating a reference frequency according to a second embodiment of the invention. For implementation reasons two free-running 10 MHz oscillators can be advantageous, i.e. one in the outdoor unit for generating the LO carrier and one in the indoor unit which is fed to the synthesizer. In this case a compensation signal is needed such that the RF carrier signal is not affected by the inaccuracies from both oscillators. The outdoor unit 48 still comprises a first oscillator 41 whose signal is fed to a frequency multiplier 42 yielding a LO carrier signal $f_{LO}$. Furthermore, an output signal of the first oscillator 41 is fed to the processing unit 45. A second oscillator 44 is placed in the indoor unit 49 whose output signal is both fed to the processing unit 45 and the synthesizer 46. The digital algorithms 51, 52 estimate the frequency deviation of each oscillator 41, 42 with regard to the timing information delivered by the PCR values within the data stream 11. The estimation can be carried out as described with regard to the FIGS. 2 and 3. Using the frequency deviations obtained by the digital algorithms 51, 52 a combiner 53 yields a compensation value $\Delta f_{COMP}$ for the synthesizer 46. As already described according to FIG. 1 the output signal of the synthesizer 46 is mixed by a mixer 47 with a user signal yielding the IF carrier signal $f_{IF}$. This signal is fed together with the LO carrier $f_{LO}$ to a further mixer 43 yielding the RF carrier signal which is not affected by the instabilities of both free-running oscillators 41, 44.

In the following the calculation of the value $\Delta f_{COMP}$ by the processing unit 45 will be explained. $F_{OSC,out}$ and $f_{OSC,in}$ are denoted as the frequencies of the outdoor and indoor oscillators. Composing into their nominal value and the fluctuation about the nominal value yields:

$$f_{OSC,out} = f_{OSC,nom} + \Delta f_{OSC,out}$$

$$f_{OSC,in} = f_{OSC,nom} + \Delta f_{OSC,in}$$

The LO and IF frequencies are given by $$f_{LO} = m_{LO} f_{OSC,out}$$

and $$f_{IF} = m_{IF}(f_{OSC,in} + \Delta f_{COMP}),$$

where $\Delta f_{COMP}$ is a compensation signal to be applied to the IF synthesizer, $m_{LO}$ denotes the multiplying factor of the frequency multiplier 42 and $m_{IF}$ denotes the multiplying factor of the synthesizer 46. The resulting RF frequency in given by $$f_{RF} = F_{RF,nom} + (m_{LO} \Delta f_{OSC,out} + m_{IF} \Delta f_{OSC,in} + m_{IF} \Delta f_{COMP})$$

where $f_{RF,nom} = (m_{LO} + m_{IF}) f_{OSC,nom}$ denotes the nominal RF frequency. The instabilities from both oscillators are compensated by selecting $$\Delta f_{COMP} = -\Delta f_{OSC,in} - \frac{m_{LO}}{m_{IF}} \Delta f_{OSC,out}.$$

The mechanisms described above assume a perfect recovery of the PCR reference frequency at the user station. However, due to the moving position of the satellite and the uncertainty on the position of the user station, the Doppler effect can slightly affect the value of the reference frequency.

For the purpose of estimating the influence on the RF carrier frequency, we consider a square area of 1000 km×1000 km, with a master station at the center of the square, and two user stations at opposite corners of the square. The latitude of the master station is 45° N, while its longitude is arbitrarily set to 0°. The co-ordinates of the stations are given in table 1.

TABLE 1

Coordinates of master station and receiving stations

| | Latitude | Longitude |
|---|---|---|
| Master station | 45° N | 0° |
| User station #1 | 49.2° N | 6.0° E |
| User station #2 | 40.8° N | 6.0° W |

The geostationary satellite is at 36000 km from the earth, in the equatorial plane at the same longitudes as the transmitting station (i.e. 0°). The motion of the satellite is characterized by its speed in the radial, tangential and vertical directions; these speeds are assumed to vary with time in a sinusoidal way, with a maximum speed of 2.5 m/s for all three directions, and a period of 24 h in the radial direction and 12 h in the tangential and vertical directions.

An analytical and simulation analysis leads to the results shown in Table 2. $|\Delta f|$@30 GHz indicates the offset due to the satellite motion common to all terminals. $|(\Delta f1 - \Delta f2)|$@30 GHz indicates the offset between two terminals, which is the most relevant number, since it indicates the difference that may occur between 2 user stations. These values clearly show an offset less than $\frac{1}{1000}^{th}$ of the symbol rate (of more than 200 kSym/s) and therefore validate the concept. Note that the last line also considers imperfection aspects of the PCR mechanism and the IDU oscillator phase noise.

TABLE 2

Effect of satellite motion and terminal indetermination

| | $|\Delta f|$ @ 30 GHz | $|(\Delta f_1 - \Delta f_2)|$ @ 30 GHz |
|---|---|---|
| Satellite motion: only nominal position known | <570 Hz | <11 Hz |
| Satellite motion: true position | <2.5 Hz | <0.1 Hz |

TABLE 2-continued

Effect of satellite motion and terminal indetermination

| | $|\Delta f|$ @ 30 GHz | $|(\Delta f_1 - \Delta f_2)|$ @ 30 GHz |
|---|---|---|
| communicated once per minute | | |
| Fluctuation of 27 MHz master station clock | <42 Hz | <0.43 Hz |
| PCR time jitter (45 ns rms) + phase noise (oscill.) (2nd order loop: $\zeta = 0.707$, $\omega_n = 0.08$ rad/s) | 190 Hz rms | 270 Hz rms (*) |

(*) worst case assumption: PCR time jitter at different user stations is uncorrelated The frequency offset introduced by the satellite transponder will be automatically taken into account when indicating the frequency to be used by the terminals, so the IDU must not consider any additional computations to compensate this offset for.

The received PCR values can be used for defining a time basis for the transmit timing of the TDMA return channel.

The bursts are sent according to the Burst Time Plan (BTP) received in the forward control stream. The Burst Time Plan is expressed in terms of a number of bursts starting from a reference which must be the same for all users. Each frame contains a set of bursts for which the start time is expressed by an offset with respect to the global start of frame. The Frame Description Tables (PDT) contained in the SI tables will contain the PCR value corresponding to the start of frame for each frame.

The user station must wait for the FDT that defines the structure of the uplink frame and the PCR value at the start of frame. This value may also be given as a counter offset with respect to the superframe start, which then contains the absolute PCR value at the time of superframe start. In parallel, the user station receives the BTP that defines which slots are allocated for this particular user station. The slot allocation may either be done on a connection-by-connection basis or frame-by-frame basis.

The user station must therefore implement several queues for traffic of different quality of service. A CPU in the user station must figure out the next available slot for each traffic and signaling queue and send this to a local scheduler which has its own PCR counter synchronized to the master station.

The user station must also take into account the propagation delay that depends on the distance to the satellite. The distance can be calculated from the user station location and corresponding delay must be added or subtracted to the time reference.

Table 3 shows the effect of the satellite position on the delay of one path (forward or return) between the master station and the user station, assuming only the nominal position of the satellite is known, assuming the true position of the satellite can be communicated once per minute and left constant for the whole minute, and finally taking into account the effect of a PCR arrival time jitter and local user station phase noise. $|e/f_0|$ denotes the timing error for one terminal, due to the satellite position uncertainty, $|(e_1-e_2)/f_0|$ denotes the difference of timing errors between two terminals located in different places on earth.

TABLE 3

Effect of satellite motion and terminal indetermination

| | $|e/f_0|$ | $|(e_1 - e_2/f_0)|$ |
|---|---|---|
| Satellite motion: only nominal position known | <230 µs | <2.6 µs |
| Satellite motion: true position communicated once per minute | <1.1 µs | <22 ns |
| Fluctuation of 27 MHz master station clock | — | — |
| PCR time jitter (45 ns rms) + phase noise (oscill.) (2nd order loop: $\zeta = 0.707$, $\omega_n = 0.08$ rad/s) | 3 ns rms | 4.2 ns rms |

Taking into account a slot of about 50 to 200 bytes, at rates possibly going up to 2 Mbits/s, a slot can become as short as 200 µs. Obviously, the error shown in Table 3 can be quite important with respect to the slot size. Therefore, it is necessary to accurately correct these errors. Note that burst synchronous systems are less demanding than symbol synchronous systems. For burst synchronous systems the master station receive can acquire each burst independently from previous or following ones, as long as the bursts do not overlap each other. This can be made more secure by introducing sufficient guard interval between bursts. For symbol synchronous systems, the timing needs to be precise down to about 1/10 of the symbol period, which can be very difficult to achieve in case of high bit rates.

To improve the timing accuracy, there are two solutions:
1) Ranging mechanisms through the master station, by exchanging back and forth signaling with each user station to make sure that the user station is often correcting its transmit time offset.
2) Communicating the satellite positions (Forward path and Return path if different), to the user station which computes the time offset according to this information and its own position.

Although solution 2 is much more complex and less reliable than solution 1 (the terminal location may be incorrect), it is definitely attractive in terms of bandwidth savings. Solution 1 indeed requires a large part of the bandwidth to keep terminals synchronized to the network. Since the position of the satellite is known also to the control center with a high precision, it is no basic problem to transmit this information to the user stations, where the actual distance can be determined. Other solutions could be thought of, such as mixing ranging procedures and local interpolations between ranging times at the user station.

Some remaining time offset may also come from implementation differences, and must be compensated for by the time ranging procedure managed from the master station, which indicates to the terminal how much offset is needed to correct the error.

This error is constant with the satellite position though, and must therefore only be compensated for at user station logon.

The symbol clock for the transmitter should also be locked to the 27 MHz PCR, in order to avoid time drift with respect to the reference clock of the master station.

Note however, that even for the most demanding symbol synchronous systems, where the clock of the user station should not drift by more than $1/10^{th}$ of a symbol period within a burst, this represents a frequency offset of the symbol clock of $\frac{1}{4000}^{th}$ per symbol (assuming 400 symbols per burst), which would mean about 250 ppm for the symbol clock. Since the 27 MHz PCR synchronization mechanism should allow to reach easily $10^{-2}$ ppm even in the case of satellite movement and terminal location uncertainty, the PCR is obviously an excellent mechanism for the symbol clock synchronization.

The phase noise of the PCR-based clock may also introduce a jitter on the symbol clock of about 3 ns rms as described in Table 3. This is less than $\frac{1}{100}^{th}$ of the fastest symbol rate, so should not represent any problem either.

What is claimed is:

1. Apparatus for generating a reference frequency depending on a timing information extracted from a data stream, comprising:
    at least one free-running oscillation means, wherein at least two oscillation signals are derived from the at least one oscillation means,
    estimation means for estimating for each of the at least one free-running oscillation means the frequency deviation on the basis of the timing information,
    frequency modifying means for modifying the frequency of at least one of the at least two oscillation signals by a frequency correction value,
    linking means for linking the at least two oscillation signals to a signal yielding said reference frequency wherein the reference frequency is connected with the frequencies of the at least two oscillation signals by an unambiguous functional relation,
    controlling means for determining the respective frequency correction value on the basis of the at least one estimated frequency deviation such that the timing information given by the reference frequency corresponds to the timing information extracted from said data stream.

2. Apparatus according to claim 1, wherein the timing information consists of timestamps transmitted within the data stream.

3. Apparatus according to claim 2, wherein the timestamps consist of a program clock reference (PCR) of a MPEG-2 Transport Stream based on a 27 MHz clock.

4. Apparatus according to claim 1, wherein the linking means consists of at least one mixer whose output signal has a frequency which is a linear combination of the frequencies of the respective input signals.

5. Apparatus according to claim 4, wherein the frequency of the output signal of said mixer amounts to the sum of the frequencies of the input signals.

6. Apparatus according to claim 4, wherein the frequency of the output signal of said mixer amounts to the difference of the frequencies of the input signals.

7. Apparatus according to claim 1, wherein the estimation means estimates the frequency deviation of the respective oscillation means according to the formula $$\text{frequency deviation} = \frac{t_{inf}(\text{data}) - t_{inf}(\text{osc})}{t_{inf}(\text{data})} \cdot \text{frequency}(\text{osc})$$

with $t_{inf}(\text{data})$: timing information of data stream;
$t_{inf}(\text{osc})$: timing information of oscillation means; and
frequency(osc): frequency of oscillation means.

8. Apparatus according to claim 7, wherein the respective timing information is referred to the period after applying the last correction by the frequency modifying means.

9. Apparatus according to claim 1, wherein the estimation means consists of a counter whose content tracks the timing information of the data stream within a closed loop circuit and wherein the adjustment step for the counter serves as an estimation of the respective frequency deviation.

10. Apparatus according to claim 9, wherein the content of the counter serves as a reference time signal.

11. Apparatus according to claim 1, wherein the estimation means comprises a phase locked loop generating a PLL-frequency on the basis of the timing information and wherein the frequency deviation is obtained by comparing the PLL-frequency with the frequency of the respective oscillation means.

12. Apparatus according to claim 1, wherein the frequency modifying means consists of a frequency scaling means modifying the frequency of the respective oscillation signal by a scaling factor.

13. Apparatus according to claim 1, wherein the controlling means consists of a microprocessor.

14. Apparatus according to claim 1, wherein the at least one oscillation means consists of a first free-running oscillator.

15. Apparatus according to claim 14, wherein from said first free-running oscillator a first oscillation signal is derived by a frequency multiplier and a second oscillation signal is derived by a frequency divider.

16. Apparatus according to claim 15, wherein said second oscillation signal is fed to the estimation means and to the frequency modifying means yielding an IF-carrier signal.

17. Apparatus according to claim 15, wherein the at least one oscillation means comprises a second free-running oscillator yielding a third oscillation signal and wherein said second oscillation signal is fed to the estimation means and said third oscillation signal is fed to the frequency modifying means yielding an IF-carrier signal.

18. Apparatus according to claim 16, wherein the IF-carrier signal is fed together with a user signal to a mixer yielding an intermediate transmission signal.

19. Apparatus according to claim 18, wherein the intermediate transmission signal is fed together with said second oscillation signal to a mixer yielding a signal suitable for transmission with a carrier frequency corresponding to said reference frequency.

20. Telecommunication network comprising a master station and several base stations, wherein
    the master station transmits a time information in a data stream to each of the base stations and
    each of the base stations comprises an apparatus for generating a reference frequency depending on a timing information extracted from a data stream, further comprising:
        at least one free-running oscillation means, wherein at least two oscillation signals are derived from the at least one oscillation means,
        estimation means for estimating for each of the at least one free-running oscillation means the frequency deviation on the basis of the timing information,
        frequency modifying means for modifying the frequency of at least one of the at least two oscillation signals by a frequency correction value,
        linking means for linking the at least two oscillation signals to a signal yielding said reference frequency wherein the reference frequency is connected with the frequencies of the at least two oscillation signals by an unambiguous functional relation,
        controlling means for determining the respective frequency correction value on the basis of the at least one estimated frequency deviation such that the timing information given by the reference frequency corresponds to the timing information extracted from said data stream.

21. Method for generating a reference frequency depending on a timing information extracted from a data stream, comprising the steps of:

providing at least two oscillation signals derived from at least one free-running oscillation means, estimating for each of the at least one free-running oscillation means the frequency deviation on the basis of the timing information, modifying the frequency of at least one of the at least two oscillation signals by a frequency correction value, linking the at least two oscillation signals to a signal yielding said reference frequency wherein the reference frequency is connected with the frequencies of the at least two oscillation signals by an unambiguous functional relation, determining the respective frequency correction value on the basis of the at least one estimated frequency deviation such that the timing information given by the reference frequency corresponds to the timing information extracted from said data stream.

22. Method according to claim 21, wherein the timing information consists of time stamps transmitted within the data stream.

23. Method according to claim 22, wherein the timestamps consist of a program clock reference (PCR) of a MPEG-2 Transport Stream based on a 27 MHz clock.

24. Method according to claim 21, wherein at least two oscillation signals are linked by at least one mixer whose output signal has a frequency which is a linear combination of the frequencies of the respective input signals.

25. Method according to claim 24, wherein the frequency of the output signal of said mixer amounts to the sum of the frequencies of the input signals.

26. Method according to claim 24, wherein the frequency of the output signal of said mixer amounts to the difference of the frequencies of the input signals.

27. Method according to claim 21, wherein the frequency deviation of the respective oscillation means is estimated according to the formula $$\text{frequency deviation} = \frac{t_{inf}(\text{data}) - t_{inf}(\text{osc})}{t_{inf}(\text{data})} \cdot \text{frequency(osc)}$$

with $t_{inf}(\text{data})$: timing information of data stream; $t_{inf}(\text{osc})$: timing information of oscillation means; and frequency(osc): frequency of oscillation means.

28. Method according to claim 27, wherein the respective timing information is referred to the period after applying the last correction by the frequency modifying means.

29. Method according to claim 21, wherein a counter is provided whose content tracks the timing information of the data stream within a closed loop circuit and wherein the adjustment step for the counter serves as an estimation of the respective frequency deviation.

30. Method according to claim 29, wherein the content of the counter serves as a reference time signal.

31. Method according to claim 21, wherein a phase locked loop is provided generating a PLL-frequency on the basis of the timing information and wherein the frequency deviation is estimated by comparing the PLL-frequency with the frequency of the respective oscillation means.

32. Method according to claim 21, wherein the frequency of at least one oscillation signal is modified by a scaling factor.

33. Method according to claim 21, wherein the determination of the respective frequency correction value is performed by a microprocessor.

34. Method according to claim 21, wherein a first free-running oscillator is provided.

35. Method according to claim 34, wherein from said first free-running oscillator a first oscillation signal is derived by a frequency multiplier and a second oscillation signal is derived by a frequency divider.

36. Method according to claim 34, wherein said second oscillation signal is fed to the estimation means and to the frequency modifying means yielding an IF-carrier signal.

37. Method according to claim 35, wherein a second free-running oscillator is provided yielding a third oscillation signal and wherein said second oscillation signal is fed to the estimation means and said third oscillation signal is to the frequency modifying means yielding an IF-carrier signal.

38. Method according to claim 36, wherein the IF-carrier signal is fed together with a user signal to a mixer yielding an intermediate transmission signal.

39. Method according to claim 38, wherein the intermediate transmission signal is fed together with said second oscillation signal to a mixer yielding a signal suitable for transmission with a carrier frequency corresponding to said reference frequency.

* * * * *